May 14, 1929.  H. B. TROTT  1,713,199

ELECTRIC SWITCH

Filed June 18, 1928

INVENTOR
H. B. Trott
by F. N. Barber
attorney

Patented May 14, 1929.

1,713,199

UNITED STATES PATENT OFFICE.

HARVEY B. TROTT, OF McKEESPORT, PENNSYLVANIA.

ELECTRIC SWITCH.

Application filed June 18, 1928. Serial No. 286,402.

My invention relates to electric switches. One object of this invention is to provide a switch which will open and close preferably by snap action and become locked in its alternate positions. Other objects appear hereinafter.

Figures 1, 2:
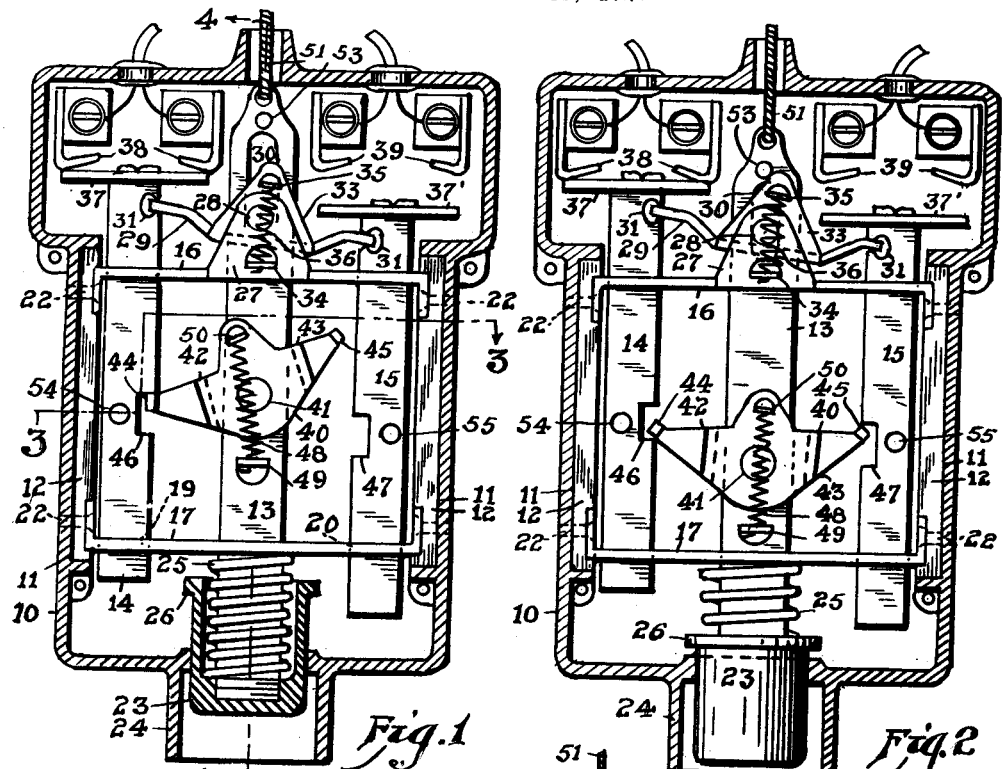
Figure 3:
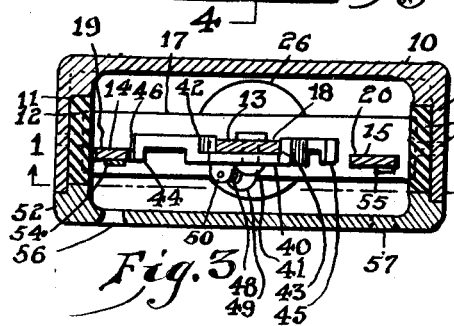
Figure 4:
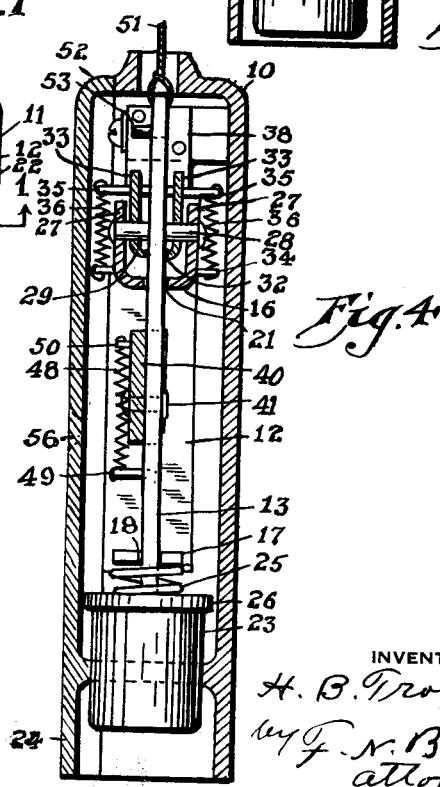

Referring to the drawing, Fig. 1 is an elevation of my invention, the casing being shown in section on the line 1—1 on Fig. 3 and the parts being as they are at the time the contacts 37 and 38 are closed but before the actuating mechanism has returned to its idle position; Fig. 2, a view like to Fig. 1, but showing all the actuating mechanism except the trigger 40 returned to its idle position; Fig. 3, a cross-section on the line 3—3 on Fig. 1; Fig. 4, a vertical central section on the line 4—4 on Fig. 1; and Fig. 5, a front view of a part of the invention with parts broken away.

On the drawing, 10 designates a casing having at opposite edges recesses 11 which contain strips 12 of insulating material.

13 is a switch operating bar or member standing centrally between the sides and edges of the casing and parallel therewith. At opposite sides of the bar 13 and near the strips 12 of insulation are the contact-carrying bars 14 and 15. The three bars 13, 14 and 15 are guided by openings in the cross-bars or guide bars 16 and 17 so as to travel in parallel paths. These cross-bars are spaced apart so as to receive and guide the opposite terminal portions of the respective bars 14 and 15. Fig. 3 shows the holes 18, 19 and 20 in the bar 17 for guiding the lower ends of the respective bars 13, 14 and 15. Fig. 4 shows the hole 18 and also the hole 21 in the bar 16 for the upper portion of the bar 13. The ends of the bars 16 and 17 are shown embedded in the strips 12 of insulation, where they are held in place by screws 22 in the strips and edges of the casing.

The lower end of the bar 13 has the cap or push-button 23 threaded thereon extending out through the lower end of the casing and into the cup 24 projecting downwardly from the casing. A helical spring 25 surrounds the bar 13 between the cross-bar 17 and the outer end of the cap, the outer end of the spring being enclosed by the cap. The spring is under compression and tends to move the bar downwardly.

The bar 16 has two spaced apart upwardly-extending ears 27 in which is mounted the fixed cross-pin or pivot 28 on which the rocker member 29 is centrally pivoted. The bar 13 has the slot 30 to receive the pin 28 so that the bar 13 can travel longitudinally. The ends of the bar 29 are pivotally connected to the bars 14 and 15 in any suitable manner, as by their ends projecting into notches 31 in the edges of the bars. The rocker member 29 has the hole 32 to receive the bar 13 and is provided with two upstanding ears 33, the member 29 having its central portion and ears 33 between the ears 27. The central portion of the bar 16, or rather the bases of the ears 27, have outwardly projecting lugs 34 and the central portion of the ears 33 have correspondingly outwardly projecting lugs 35. Coiled springs 36 are stretched between the pairs of lugs on opposite sides of the bar 13. The springs stand parallel with the bar 13 and directly opposite the ends of the pivot 28 when the rocker member 29 is at right angles with the bar 13, that is, has its ends in a line at right angles with the bar 13. The springs 36 are overthrow springs and snap the rocker member and the bars 14 and 15 one way or the other when the rocker member is turned so as to cause the spring to pass the dead center between the lugs 34 and 35 and the pivot 28 in a manner well known.

The upper ends of the bars 14 and 15 carry the respective contacts 37 and 37', adapted alternately to bridge or connect the pairs of contacts 38 and 39.

40 is a trigger or rocking member pivoted centrally between its ends on the pin 41 carried by the bar 13 between the guide-bars 16 and 17. The trigger has shoulders 42 and 43 which engage the edges of the bar 13 to limit the rocking of the trigger in either direction. The ends 44 and 45 of the trigger are not in a straight line through the center of the pin 41. Lines drawn from the ends of the trigger to the center of the pin 41 form an angle pointing downwardly. The opposing edges of the bars 14 and 15 have recesses 46 and 47 into which the ends of the trigger enter for actuating the bars 14 and 15. The ends of the trigger are such distances from the pin 41 and lines connecting the said ends to the pin 41 form with each other such an angle that, when the rocker member is in one extreme position, one end, as 44, of the trigger will be in one of the recesses, as 46, while the other end, as 45, will be out of the other recess, as 47, as shown in Fig. 1. A spring 48 is stretched between the lug 49 on the bar 13 and the lug 50 on the trigger above the pin 41. When the ends of the trigger are in a straight line at right angles with the bar 13, the spring will stand directly in front of the pin 41 and will be parallel with the bar 13. The spring 48 is an overthrow spring to automatically move the trigger to its limits as soon as the spring passes the dead center between the pin 41 and the lugs 49 and 50.

A cord 51 is attached to the upper end of the bar 13 for operating the latter when more convenient than the cap or push-button 23.

52 is the cover for the casing.

In Fig. 1, the bar 13 has been moved upwardly to its limit by the push-button 23 or the cord 51. During this movement of the bar 13, the end 44 of the trigger 40 has been in engagement with the upper wall of the recess 46 and has pushed the bar 14 upwardly until the contact 37 engaged the contacts 38 unless the overthrow spring 36 completed the movement of the bar 14 before the trigger end 44 could operate the bar 14 to its full upper limit. Fig. 1 shows the bar 13 still at its upper limit. The rocking member 29 has been operated by the bar 14 and caused the bar 15 to move to its lower limit and the contact 37' to open the contacts 39. The spring 36 holds the bars 14 and 15 in the position shown in Fig. 1.

When the bar 13 is released, the spring 25 moves it downwardly. During the first part of the descent of the bar 13, the trigger moves downwardly without turning, but when the trigger end 44 reaches the bottom wall of the recess 46, the end 44 is prevented from further downward travel and then becomes a pivotal point or the fulcrum of the trigger. As the bar 13 continues to descend, the end 45 continues to descend and to gradually move to the right because it is moving from points above its pivot 41 to a point in a line at right angles with the bar 13 and through the center of the pin 41. The end 45 is traveling on a curve whose distance from the bar 15 is decreasing. As the trigger becomes nearly at right angles to the bar 13 as shown in Fig. 2, the trigger end 45 arrives at the upper end of the recess 47. The spring 48 has passed its dead center as shown in Fig. 2 and at once causes the trigger to turn clockwise, causing the end 45 to go laterally further into the recess 47 and the end 44 to move to the right and out of the recess 46. Fig. 2 shows the bar 13 nearly to its lower limit with the trigger just ready to turn clockwise, as described. The trigger will be stopped by the shoulders 42 and 43.

When the bar 13 is again moved upwardly, the trigger end will engage the upper wall of the recess 47 and push the bar 15 upwardly and cause the contact 37' to engage the contact 39, and the contact 37 to move away from the contacts 38. During this operation the rocking member 29 will turn anticlockwise and the springs 36 will assist in opening and closing the contacts and will hold the bars 14 and 15 in their assumed places.

When the bar 13 again descends, the trigger end 45, will travel down for a time in the recess 47, and when it meets the lower wall of the recess 47, it will turn anticlockwise and cause the end 44 to enter the recess 46 and the end 45 to be moved out of the recess 47. In this operation, the spring 48 snaps the trigger anticlockwise as soon as it passes its dead center.

In order to more securely lock the bars 14 and 15 in their final position, the bar 13 has the pin 53 which engages one edge or the other of the upwardly tapering ears 33 on the rocker member 29 just as the bar 13 reaches its lower limit.

The switch is shown with the bars 13, 14 and 15 vertical, but the switch will function in any position of the bars. If desired one of the sets of contacts 36—38 and 37—39 may be omitted, or the lower ends of the bars 14 and 15 may be provided with contacts.

Figure 5:
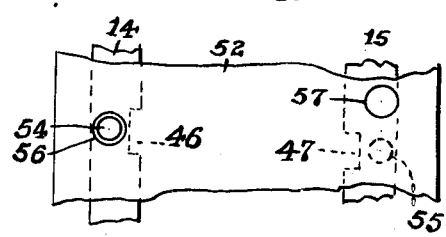

The bars 14 and 15 bear the respective indicators 54 and 55 which may be circles visible through the windows 56 and 57 in the cover 52. In Figs. 3 to 5 the indicator 54 is visible through the window 56 and shows that the bar 13 is in its contact-closing position. In Fig. 5, the indicator 55 is shown below the window 57, but it will be opposite that window when the bar 15 closes its contact 37'. At the same time the indicator 54 will descend below the window 56.

I claim:—

1. In an electric switch, a rocker member mounted between its ends on a fixed pivot, a pair of slidable links pivotally connected to the ends of the rocker member and at the same side thereof, a shoulder on each of the opposing faces of the links, an operating bar slidable between the links and parallel therewith, a trigger pivoted between its ends on a pin carried by the bar, means limiting the pivotal movement of the trigger, one end of the trigger being adapted to engage a shoulder on one link upon the movement of the bar in one direction so as to move the said links in opposite directions, and the end of the trigger being adapted to engage a shoulder on the other link upon the next succeeding movement of the bar in the direction described so as to reverse the movements of the links, an electrical contact controlled by one of the links, and a fixed contact engageable by the first contact.

2. In an electric switch, a rocker member mounted between its ends on a fixed pivot, a pair of slidable links pivotally connected to the ends of the rocker member and at the same side thereof, a pair of shoulders on the opposing faces of the links, an operating bar slidable between the links and parallel therewith, a trigger pivoted between its ends on a pin carried by the bar, means limiting the pivotal movement of the trigger, one end of the trigger being adapted to engage a shoulder on one link upon the movement of the bar in one direction so as to move the said links in opposite directions, and the end of the trigger being adapted to engage a shoulder on the other link upon the next suceeding movement of the bar in the direction described so as to reverse the movements of the links, the end of the trigger which moves a link at any operation of the bar engaging the remaining shoulder on that link as the bar returns to its initial position and causing the other end of the trigger to come to rest between the shoulders on the other link, an electrical contact controlled by one of the links, and a fixed contact engageable by the first contact.

3. In an electric switch, a rocker member mounted between its ends on a fixed pivot, a pair of slidable links pivotally connected to the ends of the rocker member and at the same side thereof, a shoulder on each of the opposing faces of the links, an operating bar slidable between the links and parallel therewith, a trigger pivoted between its ends on a pin carried by the bar, means limiting the pivotal movement of the trigger, one end of the trigger being adapted to engage a shoulder on one link upon the movement of the bar in one direction so as to move the said links in opposite directions, and the end of the trigger being adapted to engage a shoulder on the other link upon the next succeeding movement of the bar in the direction described so as to reverse the movements of the links, an electrical contact controlled by one of the links, a fixed contact engageable by the first contact, and means carried by the bar for locking the links when the bar is in its initial position.

4. In a switch, a pair of members, means for moving them in opposite directions, a switch contact carried by one of the members, an indicator carried by one member, and a casing enclosing the members and having a window to display the indicator when the members are in one position.

In testimony whereof I hereunto affix my signature.

HARVEY B. TROTT.